US010265703B2

(12) United States Patent
Barkie et al.

(10) Patent No.: US 10,265,703 B2
(45) Date of Patent: Apr. 23, 2019

(54) SMART CONTROL FOR AIRBORNE PARTICLE COLLECTION

(71) Applicant: International Business Machines Corporation, Armonk, NY (US)

(72) Inventors: Eric J. Barkie, Cary, NC (US); Benjamin L. Fletcher, Denver, CO (US); Andrew P. Wyskida, Fishkill, NY (US)

(73) Assignee: International Business Machines Corporation, Armonk, NJ (US)

( * ) Notice: Subject to any disclaimer, the term of this patent is extended or adjusted under 35 U.S.C. 154(b) by 0 days.

(21) Appl. No.: 15/824,319

(22) Filed: Nov. 28, 2017

(65) Prior Publication Data
US 2018/0078949 A1 Mar. 22, 2018

Related U.S. Application Data

(62) Division of application No. 14/818,628, filed on Aug. 5, 2015, now Pat. No. 9,925,544.

(51) Int. Cl.
*B03C 3/36* (2006.01)
*F24F 3/16* (2006.01)
(Continued)

(52) U.S. Cl.
CPC ............... *B03C 3/36* (2013.01); *B03C 3/12* (2013.01); *B03C 3/38* (2013.01); *B03C 3/47* (2013.01);
(Continued)

(58) Field of Classification Search
CPC .... B03C 3/36; B03C 3/12; B03C 3/38; B03C 3/47; F24F 3/1603; F24F 3/166
(Continued)

(56) References Cited

U.S. PATENT DOCUMENTS 4,251,234 A 2/1981 Chang
4,726,824 A 2/1988 Staten
(Continued)

FOREIGN PATENT DOCUMENTS

WO 2009035714 A1 3/2009

OTHER PUBLICATIONS

W.J. Fisk et al., "Performance and Costs of Particle Air Filtration Technologies," Indoor Air, Apr. 2001,15 pages, vol. 12, No. 4.
(Continued)

*Primary Examiner* — Steven B McAllister
*Assistant Examiner* — Allen Schult
(74) *Attorney, Agent, or Firm* — Kristofer Haggerty; Ryan, Mason & Lewis, LLP (57) ABSTRACT

An airborne particle collection system includes an airflow directing unit, register units, a fan unit, and a control system. The airflow directing unit includes a plurality of separately controlled air distribution segments. Each register unit includes a motorized damper and filter. The fan unit is connected to the airflow directing unit and to the register units through piping. The fan unit injects air into the airflow directing unit, and generates a vacuum force that causes exhaust air with airborne particles to be pulled into the register units and filtered by the filters within the register units. The control system selectively controls the air distribution segments of the airflow directing unit and the motorized dampers of the register units to generate alterable airflow patterns between the airflow directing unit and the register units in different zones within a room in which the airflow directing unit and the register units are disposed.

20 Claims, 6 Drawing Sheets

(51) Int. Cl.
    *B03C 3/12*     (2006.01)
    *B03C 3/38*     (2006.01)
    *B03C 3/47*     (2006.01)

(52) U.S. Cl.
    CPC ............ *F24F 3/1603* (2013.01); *F24F 3/166* (2013.01); *B03C 2201/28* (2013.01); *F24F 2003/1614* (2013.01); *F24F 2003/1682* (2013.01); *Y02A 50/21* (2018.01)

(58) Field of Classification Search
    USPC ........................................................ 454/235
    See application file for complete search history.

(56) References Cited

U.S. PATENT DOCUMENTS

| | | |
|---|---|---|
| 2001/0053668 A1 | 12/2001 | Berger |
| 2005/0064812 A1 | 3/2005 | Darling |
| 2006/0099904 A1 | 5/2006 | Belt et al. |
| 2008/0160903 A1 | 7/2008 | Fontana |
| 2008/0176503 A1 | 7/2008 | Stanimirovic |
| 2012/0222851 A1 | 9/2012 | Arinez et al. |
| 2014/0326794 A1 | 11/2014 | Frank |
| 2015/0292753 A1 | 10/2015 | Kutsuzawa et al. |

OTHER PUBLICATIONS

List of IBM Patents or Patent Applications Treated as Related.

SMART CONTROL FOR AIRBORNE PARTICLE COLLECTION

TECHNICAL FIELD

This disclosure relates generally to air filtration techniques, and in particular, to systems and methods for collecting airborne particles such as dust, allergens, and other small particulates.

BACKGROUND

In general, air filtration systems are commonly utilized in commercial and residential buildings to reduce the amount of airborne particles from incoming outdoor air and from recirculated indoor air, such as pollen, dust, bacteria, mold spores, pet dander, smoke, and other allergens or irritants, which individuals can breathe in and cause health issues. Conventional air filtration systems are implemented, for example, by placing filters in the supply airstreams of forced-air heating, ventilating, and air conditioning (HVAC) systems of commercial and residential buildings, wherein such filters are capable of filtering very small (micron, submicron) airborne particles that can cause health issues. Other conventional air filtration systems include stand-alone, portable, air filtering units, which are commonly used in residences. In many instances, such conventional air filtrations systems are not adequate or effective in removing unwanted airborne particles.

SUMMARY

Embodiments of the invention generally include airborne particle collection systems and methods for smart control of airborne particle collection systems.

For example, one embodiment includes an airborne particle collection system. The airborne particle collection system includes an airflow directing unit, register units, a fan unit, and a control system. The airflow directing unit includes a plurality of separately controlled air distribution segments. Each register unit includes a motorized damper and a filter. The fan unit is connected to the airflow directing unit and to the plurality of register units through piping. The fan unit injects air into the airflow directing unit, and generates a vacuum force that causes exhaust air with airborne particles to be pulled into the register units and filtered by the filters within the register units. The control system selectively controls the air distribution segments of the airflow directing unit and the motorized dampers of the register units to generate alterable airflow patterns between the airflow directing unit and the register units in different zones within a room in which the airflow directing unit and the register units are disposed.

Another embodiment includes a method for collecting airborne particles. The method includes injecting air into an airflow directing unit comprising a primary air tube, and a plurality of separately controlled air distribution segments connected to the primary air tube, wherein each air distribution segment comprises an airflow control valve connected to the primary air tube, an air distribution channel connected to an output of the airflow control valve, and a series of air exits holes aligned to the air distribution channel; generating a vacuum force that causes exhaust air with airborne particles to be pulled into one or more register units, wherein each register unit comprises a motorized damper and a filter; filtering the exhaust air using the filters of the register units; and selectively activating the airflow control valves of the air distribution segments and the motorized dampers of the one or more register units to generate alterable airflow patterns between the airflow directing unit and the one or more register units in different zones within a room in which the airflow directing unit and the one or more register units are disposed.

These and other embodiments will be described in the following detailed description of embodiments, which is to be read in conjunction with the accompanying figures.

BRIEF DESCRIPTION OF THE DRAWINGS

FIG. 1 schematically illustrates an airborne particle collection system according to an embodiment of the invention.

FIG. 2 schematically illustrates an airborne particle collection system according to another embodiment of the invention.

FIGS. 3A and 3B are schematic views of an airflow directing unit according to an embodiment of the invention, wherein FIG. 3A is a perspective view of the airflow directing unit and FIG. 3B is a cross sectional top plan view of the airflow directing unit along a plane defined by line 3B-3B in FIG. 3A.

FIG. 4 is a schematic illustration of a register unit according to an embodiment of the invention.

FIG. 5 is a schematic illustration of a register unit according to another embodiment of the invention.

FIG. 6 is a method for controlling an airborne particle collection system according to an embodiment of the invention.

FIG. 7 illustrates a computer system for controlling an airborne particle collection system, according to an embodiment of the invention.

DETAILED DESCRIPTION OF EMBODIMENTS

Embodiments will now be discussed in further detail with regard to airborne particle collection systems and methods for smart control of airborne particle collection systems. It is to be understood that various system components and methods of operating airborne particle collection systems, as generally described and illustrated in the figures herein, may be arranged and designed in a wide variety of different configurations. Thus, the following detailed description of illustrative embodiments, as represented in the attached figures, is not intended to limit the scope of the application as claimed, but is merely representative of example embodiments of the application.

FIG. 1 schematically illustrates an airborne particle collection system 100 according to an embodiment of the invention. The airborne particle collection system 100 comprises a control system 110, a fan unit 120, an air ionizer unit 130, an airflow directing unit 140, a plurality of register units 150-1, 150-2, 150-3 (collectively referred to as register units 150), control wiring 160, and air supply/exhaust piping 170. A further shown in FIG. 1, the airflow directing unit 140 and the register units 150 are located with a room 180 of a building or residence, for example, having an inner perimeter defined by four walls 181, 182, 183 and 184.

In one embodiment of the invention, as shown in FIG. 1, the airflow directing unit 140 comprises an elongated unit which is disposed on a floor of the room 180 and which extends along, and is mounted to, the bottom portion of a first wall 181 of the room 180. In addition, in one embodiment of the invention, the register units 150 serve as air return registers that are mounted in the floor at various positions along the bottom of a second wall 182, which is opposite the first wall 181.

Figure 1:
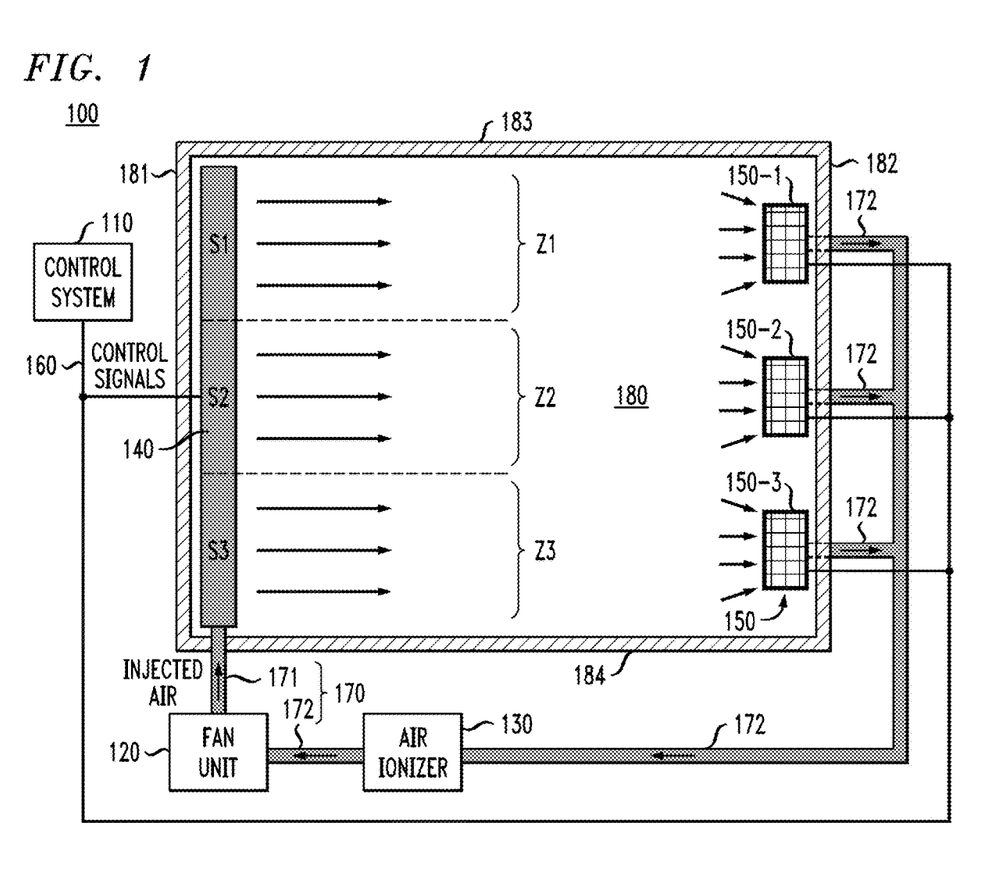

The fan unit 120 is connected to the airflow directing unit 140 and to the plurality of register units 150 through the air supply/exhaust piping 170, wherein the fan unit 120 is configured to inject air into the airflow directing unit 140, and to generate a vacuum force that causes air within the room 180 with airborne particles to be pulled into the register units 150 and filtered by filters within the register units 150. More specifically, as shown in FIG. 1, the fan unit 120 is an inline fan unit that is configured to inject air into the airflow directing unit 140 through an upstream portion 171 of the piping 170, which connects an air outlet of the fan unit 120 to an air inlet of the airflow directing unit 140. The fan unit 120 is also configured to generate a vacuum in downstream portions 172 of the piping 170 connected to an air inlet of the fan unit 120, wherein the vacuum generates a suction force that pulls airborne particles into the register units 150.

In one embodiment, the fan unit 120 comprises a vacuum fan that is configured to "pull" air from the downstream piping 172 and inject the pulled air into the airflow directing unit 140 through the upstream portion 171 of the system piping 170, thereby creating a vacuum in the downstream portion 172 of the system piping 170. In another embodiment, the fan unit 120 comprises an air blower unit that is configured to "push" air into the airflow directing unit 140 through the upstream portion 171 of the system piping 170, thereby creating a vacuum in the downstream portion 172 of the system piping 170.

The airflow directing unit 140 comprises a plurality separately controlled air distribution segments S1, S2 and S3, which operate under the control of control signals generated by the control system 110, to selectively output and direct airflow to different zones (e.g., zones Z1, Z2, and Z3) within the room 180. An illustrative embodiment of an airflow directing unit will be described in further detail below with reference to FIGS. 3A and 3B. Each of the register units 150 includes a filter and a motorized damper that operates under the control of control signals generated by the control system 110 to selectively open and close the motorized damper so that exhaust air with airborne particles is selectively exhausted in the different zones within the room 180. Illustrative embodiments of register units will be described in further detail below with reference to FIGS. 4 and 5.

As further depicted in FIG. 1, in one embodiment of the invention, the air ionizer unit 130 is connected downstream of the fan unit 120. The air ionizer unit 130 is configured to electrically charge air molecules using a process known as ionization. For example, in one embodiment of the invention, the air ionizer unit 130 comprises electrostatically charged plates to electrically charge air molecules (which flow through the air ionizer unit 130) and produce positively charged gaseous ions (cations) or negatively charged gaseous ions (anions) such as, e.g., $N_2^-$ or $O_2^-$.

The ionized air molecules (e.g., negative ions) which are output from the air ionizer unit 130 are injected into the airflow directing unit 140 by operation of the fan unit 120. The ionized air molecules are then dispersed into the room 180 via the airflow that is emitted from the airflow directing unit 140. As the ionized air molecules flow across the room 180, the ionized air molecules attach to various airborne particles such as dust, pollen, cigarette smoke, pet dander, and other allergens that exist within the room 180, creating charge particles. The ionized air molecules and charged particles are pulled towards the register units 150 by virtue of the vacuum force that is generated in the downstream portions 172 of the system piping 170 connected to the register units 150.

In one embodiment of the invention, the register units 150 include electrostatic air filters that are electrically charged opposite to the electrical charge of the ionized air molecules and charged airborne particles. In this manner, the charged airborne particles are attracted and held by the oppositely charged electrostatic filters. In one embodiment of the invention, the electrostatic filters include a porous dielectric material that is positioned between a pair of electrodes, wherein exhaust air passes through the dielectric material. A voltage potential difference is applied across the electrodes to induce an electrostatic field in the dielectric material which is sufficient to cause charged particles within the exhaust air stream flowing through the electrostatic filter to adhere to the dielectric material.

As further shown in FIG. 1, the various system components 120, 130, 140, and 150 are connected to the control system 110 via the control wiring 160, wherein the control wiring 160 includes dedicated wiring for transmitting control signals to the various system components as well as optional low voltage wiring to supply low voltage (e.g., DC or AC voltage) to one or more of the system components 120, 130, 140 and 150, as needed, to operate low voltage components. In addition, although not specifically shown, the various system components such as the fan unit 120 and air ionizer unit 130 are connected to the electrical supply grid of the given building to provide high-voltage AC power that is needed to operate high-voltage components.

In one embodiment of the invention, the control system 110 generates control signals to the fan unit 120 to perform functions such as automatically controlling the activation and deactivation of the fan unit 120 (e.g., turning on/off) during user-specified time periods during the day, or changing the fan speed to adjust (increase or decrease) the air flow rate (e.g., liters per minute) according to user-specified program parameters. Moreover, as explained in further detail below, the control system 110 is configured to selectively control the air distribution segments S1, S2, and S3 of the airflow directing unit 140 and the motorized dampers of the register units 150 to generate alterable airflow patterns between the airflow directing unit 140 and the register units 150 in different zones (e.g., Z1, Z2, Z3) within the room 180 to optimize the collection of airborne particles. For example, the control system 110 can selectively activate the air distribution segments S1, S2, and S3 of the airflow directing unit 140 in a pre-programmed sequence to generate different airflow patterns that are directed to one or more of the register units 150. In addition, the control system 110 can selectively control the motorized dampers of the register units 150 to generate different airflow patterns that are pulled towards one or more of the register units 150 by the vacuum force (e.g., the motorized dampers of the register units 150 can be selectively opened and closed in a pre-programmed sequence).

FIG. 2 schematically illustrates an airborne particle collection system 200 according to another embodiment of the invention. The airborne particle collection system 200 of FIG. 2 is similar to the airborne particle collection system 100 of FIG. 1, except that the register units 150 in FIG. 2 are shown mounted within the lower portion of the wall 182, as opposed to the floor. It is to be understood that the placement of the air directing unit 140 and register units 150 as shown in FIGS. 1 and 2 is merely illustrative, wherein the utilization and placement of one or more air directing units 140 and register units 150 within a given room will vary depending on various factor such as the size and shape of the room, the contents of the room, etc.

For example, in a relatively large rectangular shaped room, one or more air directing units 140 can be placed adjacent to a bottom of each wall, e.g., walls 181, 182, 183 and 184 of the room 180 (in FIG. 1), wherein an array of register units 150 are disposed within the floor in a central portion of the room 180. In this manner, the air directing unit(s) 140 on each wall can be sequentially activated to push airborne particles toward the center of room 180, wherein the airborne particles are pulled (via vacuum suction force) into the centrally located register units 150 and filtered. In other embodiments, one or more air directing units 140 can be positioned at an upper portion of the wall adjacent the ceiling, in which case the elevated air directing unit(s) can push the airborne particles down towards the register units 150.

Figure 2:
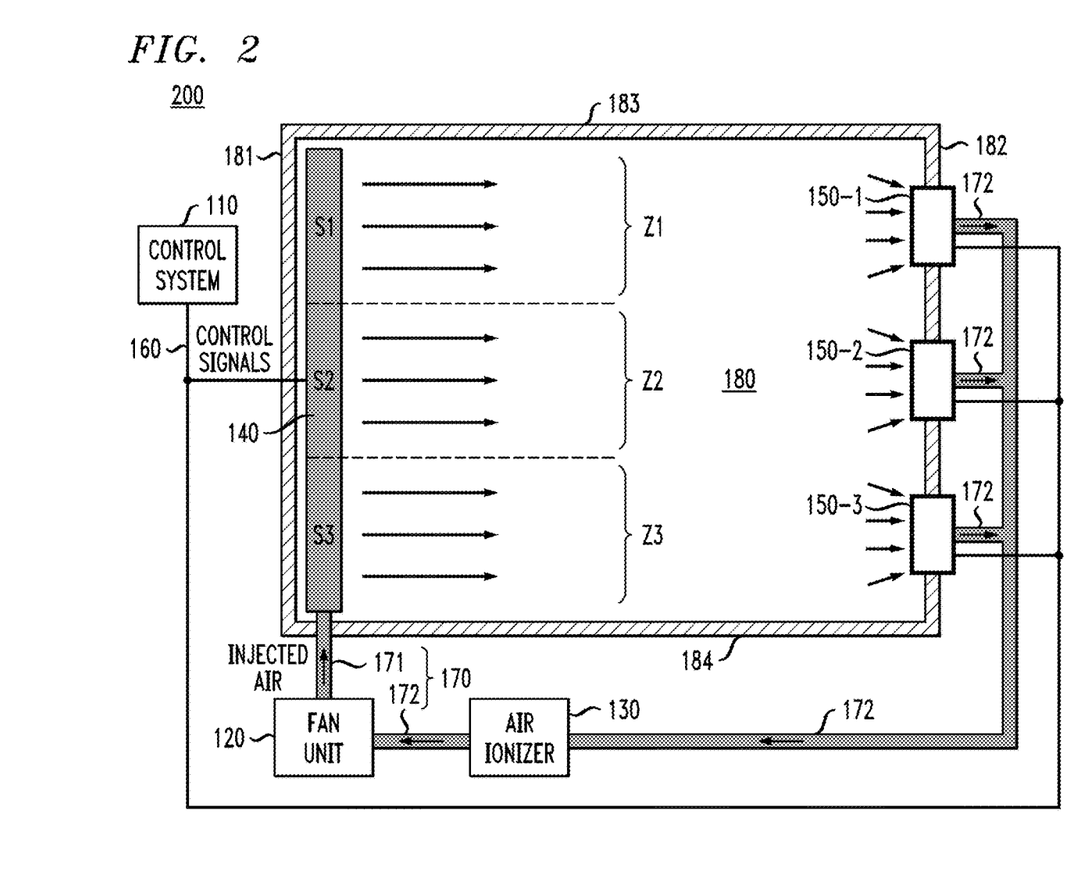
Figure 3A:
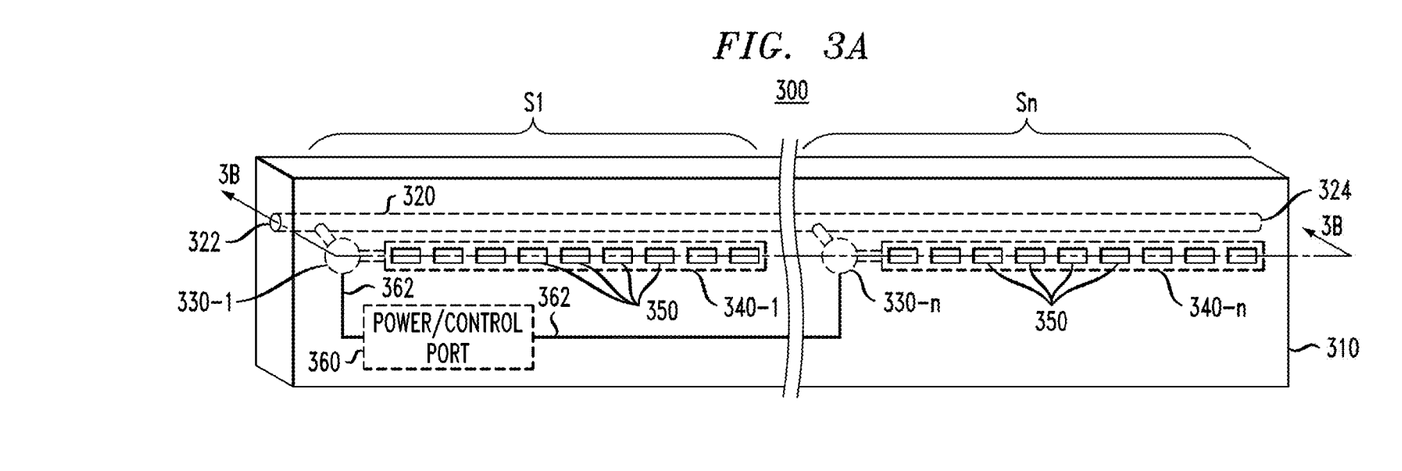
Figure 3B:
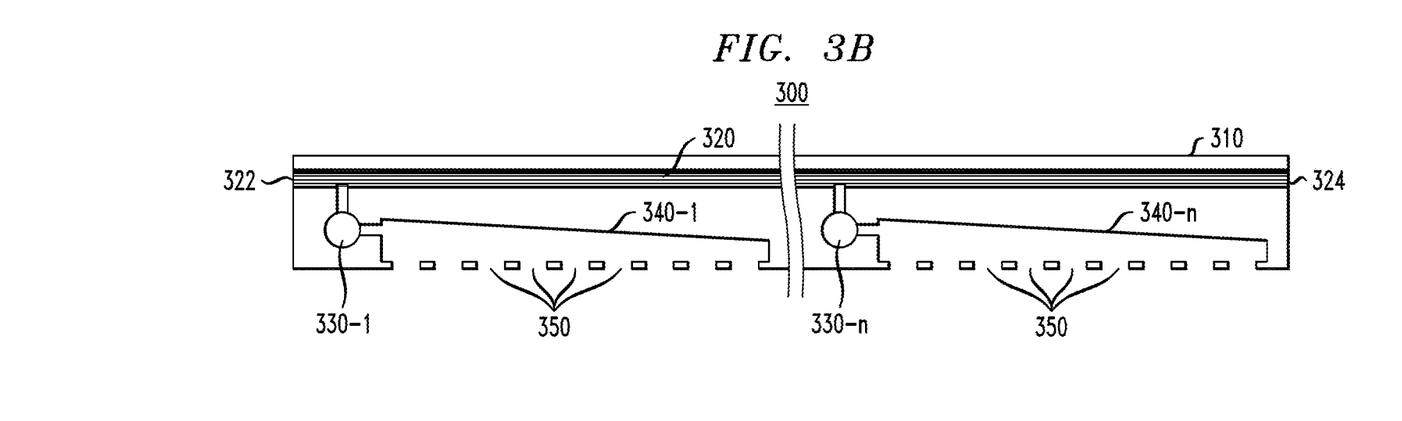

FIGS. 3A and 3B are schematic views of an airflow directing unit 300 according to an embodiment of the invention. FIG. 3A is a perspective view of the airflow directing unit 300 showing internal components in phantom (dashed lines) and FIG. 3B is a cross sectional top plan view of the airflow directing unit 300 along a plane defined by line 3B-3B in FIG. 3A. The airflow directing unit 300 shown in FIGS. 3A/3B is an illustrative embodiment of an airflow directing unit which can be implemented in the systems 100 and 200 of FIGS. 1 and 2.

As shown in FIGS. 3A/3B, the airflow directing unit 300 comprises a casing 310, a primary air tube 320 (having an inlet 322 and an outlet 324), and a plurality (n) of separately controlled air distribution segments S1, ..., Sn connected to the primary air tube 320. Each air distribution segment S1, ..., Sn comprises a respective airflow control valve 330-1, ..., 330-n (collectively referred to as airflow control valves 330) connected to the primary air tube 320, a respective air distribution channel 340-1, ..., 340-n (collectively referred to as air distribution channels 340) connected to an output of a respective airflow control valve 330-1, ..., 330-n, and a series of air exits holes 350 aligned to the air distribution channels 340. The airflow directing unit 300 further comprises a power/control port 360, and internal wiring 362.

The airflow directing unit 300 is a modular unit that can be serially connected to other airflow directing units. For example, the airflow directing unit 300 can be connected directly to the fan unit 120 through piping 171 which is connected to the inlet 322 of the primary air tube 320 using a suitable adaptor. The outlet 324 of the primary air tube 320 can be connected to the inlet of another airflow directing unit using a suitable adaptor, or the outlet 324 can be capped off when the airflow directing unit 300 is used alone.

The power/control port 360 comprises an electrical adaptor that is exposed on the backside of the casing 310, for example, to allow the control/low-voltage wiring 160 from the control system 110 to be connected to the airflow directing unit 300. The power/control port 360 provides an interface between the external wiring 160 and the internal control wiring 362 which is routed to the airflow control valves 330.

The airflow control valves 330-1, ..., 300-n are selectively operated under the control of control signals generated by the control system 110 to allow air which is injected into the primary air tube 320 to flow into the respective air distribution channels 340-1, ..., 340-n, and then flow out from the air exit holes 350 that are aligned to the respective air distribution channels 340-1, ..., 340-n. In one embodiment of the invention as shown in FIG. 3B, the air distribution channels 340 comprise tapered channels wherein the cross-sectional area of each air distribution channel 340 decreases along the length of the channel 340 from the air input end of the channel 340. This tapering serves to maintain a relatively constant air pressure along the air distribution channel 340 so that the force of the airflow emitted from the exit holes 350 is relatively equal along the length of the air distribution channel 340.

In one embodiment of the invention, the airflow control valves 330 comprise electromechanically operated valves, such as solenoid valves, which are controlled by control signals generated by the control system 110. In one embodiment, each of the airflow control valves 330 comprises a two-port valve, wherein a given airflow control valve 330-1, ..., 300-n is either switched on to allow air to flow from the primary air tube 320 into a corresponding air distribution channel 340-1, ..., 340-n, or switched off to prevent air from flowing from the primary air tube 320 into the given air distribution channel 340-1, ..., 340-n.

It is to be understood that the airflow directing unit 300 shown in FIGS. 3A/3B is a generic illustration, and that various configurations of airflow directing units can be fabricated based on the framework shown in FIGS. 3A/3B. For example, in residential applications, the airflow directing unit 300 can be designed wherein the casing 310 is molded into the form of standard floor molding (e.g., colonial molding, clam-shell molding, etc.) or ceiling molding (e.g., crown molding), wherein the various components 320, 330, 340, 360, and 362, are first assembled, and then encased in some type of composite material that is formed to look like standard molding. In this embodiment, the air exit holes 350 can be perforations that are formed in the front surface of the casing 310 to expose the interior air distribution channels 340. The primary air tube 320 and air distribution channels 340, and other internal piping, can be formed of metallic material, or plastic material, and formed with a size (diameter) that is suitable for the given application.

In such embodiments where the airflow directing unit 300 is engineered to look like standard wood-type molding/casing, thinner molding profiles can be achieved by vertically disposing the various components 320, 330 and 340 in vertical relation to each other (as opposed to laterally disposing the various components 320, 330 and 340 as generically illustrated in FIGS. 3A and 3B). In this regard, existing wood molding in a given room can be retrofitted with one or more lengths of airflow directing units that are engineered to look like standard wood-type molding/casing. Moreover, depending on the application, airflow directing units that are engineered to look like standard wood-type molding/casing can be fabricated in standard or custom lengths. Moreover, custom 90 degree or 45 degree inside and outside corner moldings having internal airflow tubing along with suitable adaptors can be engineered to enable connection between airflow directing units that are disposed on different walls, for example.

In other embodiments, such as residential or commercial applications, the airflow directing unit 300 can be fabricated to have any size, shape and/or configuration based on the generic framework of FIGS. 3A/3B, which is suitable for the given application. For example, for commercial applications, the airflow directing unit 300 can be fabricated with a hollow metallic or plastic decorative casing 310, for example, which houses the various components 320, 330 and 340. For commercial applications or new installations, for example, the airflow directing units can be custom built and implemented to meet specific requirements for particle collection for different rooms within a given building.

Figure 4:
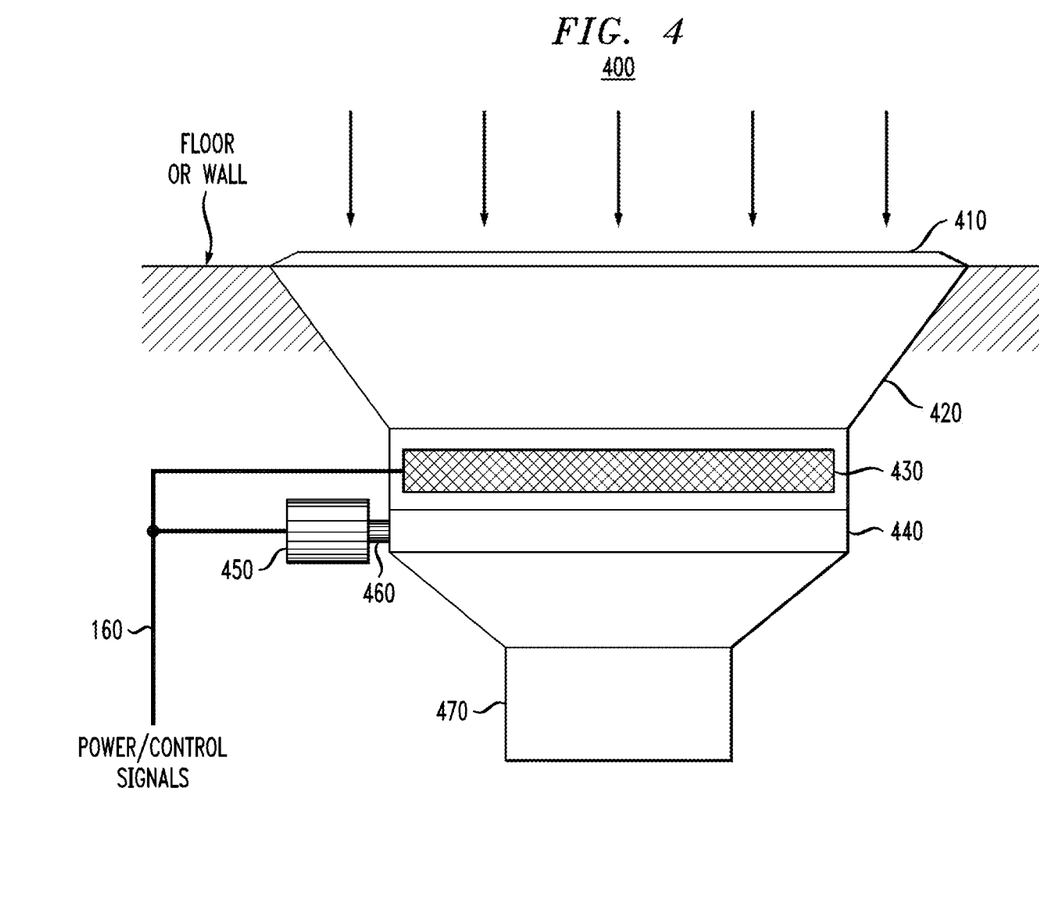

FIG. 4 is a schematic illustration of a register unit according to an embodiment of the invention. In particular, FIG. 4 schematically illustrates a register unit 400 (installed in a floor or wall) which includes a removable grill 410, a register box 420, an electrostatic filter 430, a damper unit 440, an actuator motor 450, linkage 460, and an output collar 470. In accordance with embodiments of the invention, the register unit 400 is operated under control of the control system 110 using low-voltage power/control signals applied (via the control wiring 160) to the electrostatic filter 430, and to the actuator motor 450 which controls the opening and closing of the damper 440. The register unit 400 shown in FIG. 4 is one illustrative embodiment for implementing the register units 150 shown in FIGS. 1 and 2.

In one embodiment of the invention, the damper 440 can be implemented using any standard damper configuration having one or more plates that can be positioned to completely block airflow through the register unit 400 from the front grill opening 410 to the system piping 172 connected to the output collar 470, or to enable airflow through the register unit 400. In one embodiment of the invention, the actuator motor 450 is connected to the damper 440 using suitable mechanical linkage 460, wherein operation of the actuator motor 450 is controlled by the control system 110 to modulate the flow of exhaust air through the register unit 400 due to the vacuum suction force that exists in the system piping 172 connected to the output collar 470. In this manner, the control system 110 can selectively control which register unit is operating in a given zone (e.g., Z1, Z2, Z3, FIGS. 1, 2) at a given time.

In the embodiment of FIG. 4, the electrostatic filter 430 can be accessed and cleaned by removing the front grill plate 410. As noted above, the electrostatic filter can be implemented using any standard electrostatic filter configuration and method. The voltage applied to the electrostatic filter 430 can be controlled (turned off/on, or increased/decreased) under control of the control system 110.

Figure 5:
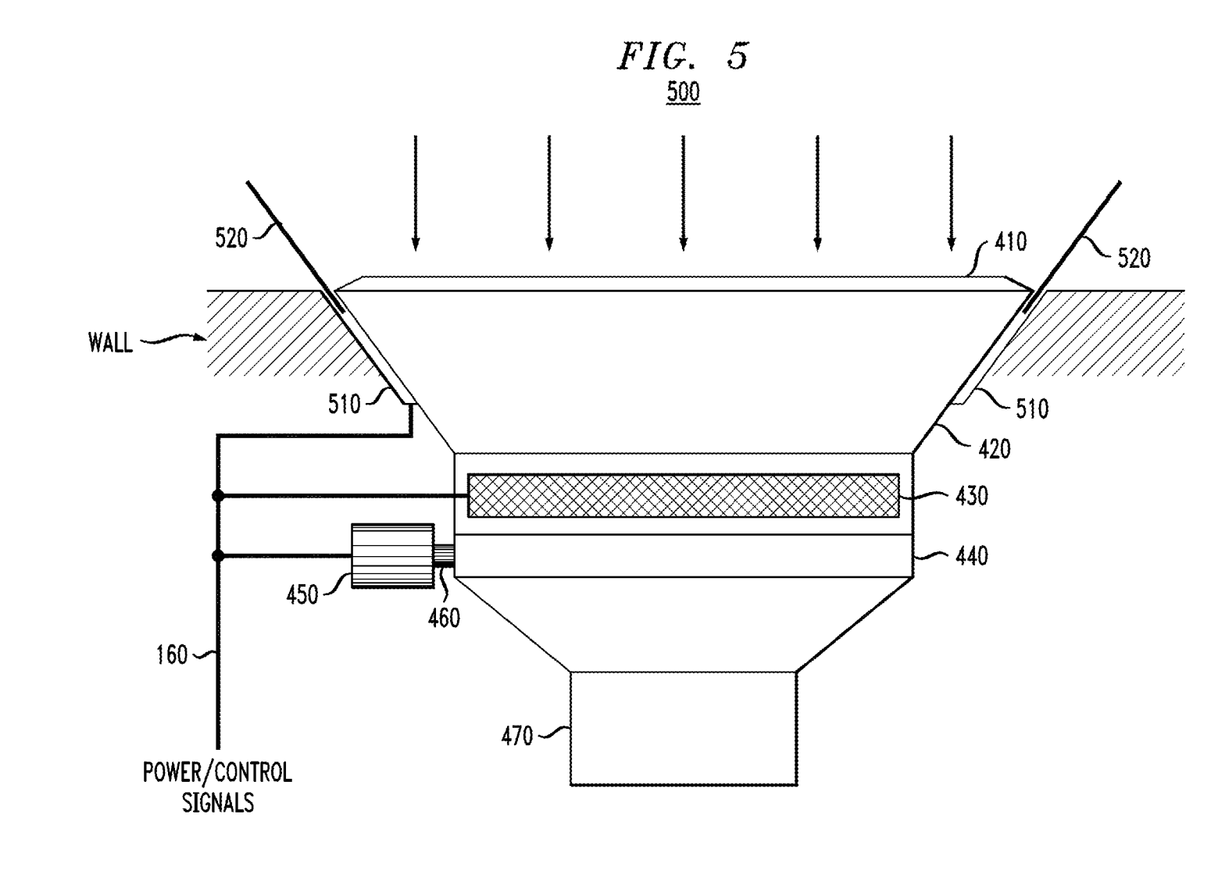

FIG. 5 is a schematic illustration of a register unit 500 according to another embodiment of the invention. The register unit 500 of FIG. 5 is similar to the register unit 400 of FIG. 4, except that the register unit 500 comprises a motorized housing 510 on the sides of the register box 420 which houses and controls the movement of movable fins 520 in response to control signals received from the control system 110 over the control wiring 160. The movable fins 520 can be extended from the housing 510 (as shown in FIG. 5) to form a funnel-shaped hood in front of the grille 410, which serves to provide a larger particle collection area that funnels airborne particles into the register unit 500. In one embodiment, a low-level voltage can be applied to the movable fins 520, so that the movable fins 520 have an electrical charge that is opposite to the electrical charge of the ionized molecules and charged airborne particles. As a result, charged airborne particles that hit the surface of the movable fins 520 are repelled from the surface of the movable fins 520 and pulled into the register unit 500 by virtue of the vacuum suction force.

In one embodiment, the motorized housing 510 can be configured with miniature motorized wheels, or other similar configurations, which are rotatably operated by one or more motors under control of the control system 110 to extend or retract the movable fins 520. FIG. 5 depicts an embodiment of a register unit 500 that is disposed within a wall adjacent a floor, wherein movable fins 520 can extend from both sides and the top side of the register unit 500 to form a funnel-shaped hood. Similar concepts can be applied to register units that are disposed within the floor, wherein movable fins are controlled to vertically extend from and retract into slots that are formed in the floor on the sides and backside (adjacent the wall) of the register unit to essentially form a "backstop" around the sides and backside of the register unit which funnels airborne particles into the register unit 500.

Figure 6:
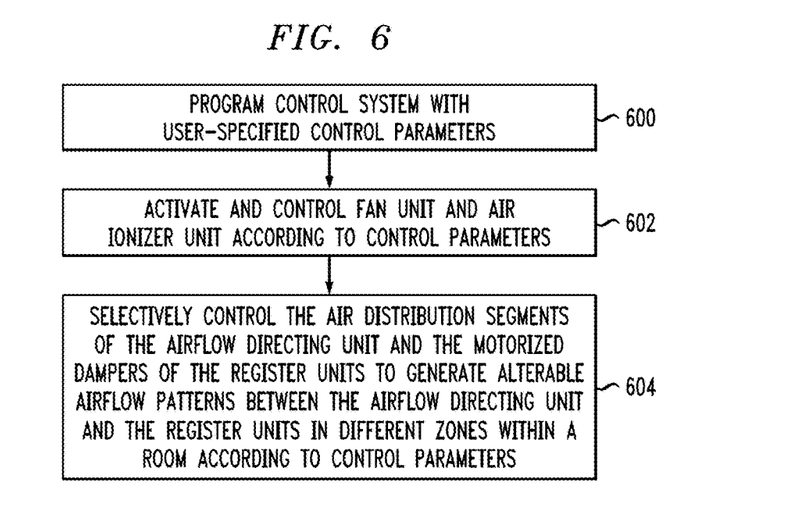

FIG. 6 is a flow diagram of a method for controlling an airborne particle collection system according to an embodiment of the invention. In particular, FIG. 6 illustrates a mode of operation of the control system 110 shown in FIGS. 1 and 2, according to an embodiment of the invention. In one embodiment, the control system 110 may be implemented as a wall-mounted smart control panel, which is programmable by user. In another embodiment, the control system 110 may be implemented are part of a computer server system (e.g., FIG. 7) that controls the airborne particle collection system, as well as other systems of a given building or home.

Referring to FIG. 6, a user can program the control system 110 with various user-specified control parameters that are used to activate and control various system components, e.g., components 120, 130, 140, and 150, FIGS. 1 and 2 (block 600). For example, the user can specify time periods during the day, or days of the month, for example, in which the particle collection system is active or inactive. Moreover, a user can specify different fan speeds for operating the fan unit 120 at different times of the day, or different ionization levels of the air ionizer 130 for generating charged air molecules. For example, during summer months or fall months when pollen counts are high, the control system 110 can be programmed such that the airborne particle collection system operates at higher performance (e.g., longer periods of time, higher fan speeds, higher ionization levels, etc.). In addition, a user can program a sequence in which different air directing units 140 or different segments thereof, and different register units 150 are sequentially activated/deactivated, so as to generate alterable airflow patterns within different zones within a given room. The alterable airflow patterns create airflow turbulence within the room in a way that effectively "sweeps" the airborne particles towards the register units, and optimizes the collection of airborne particles.

Once the control system 110 is programmed, the control system 110 can automatically control the airborne particle collection system according to the user programmed control parameters. For example, the control system 110 can automatically activate (turn on) the fan unit 120 and air ionizer unit 130 during specified time periods, and adjustably control such units 120 and 130 (e.g. fan speed, ionization level, etc.) during periods of time in which the units 120 and 130 are active according to the control parameters (block 602).

In addition, during periods of time in which the airborne particle collection system is active, the control system 110 can be configured to selectively control the air distribution segments of the airflow directing unit(s) and the motorized dampers of the register units to generate alterable airflow patterns between the airflow directing unit(s) and the register units in different zones within a room according to a programmed sequence specified by the control parameters (block 604). For example, the control system 110 can be programmed to selectively open/close the airflow control valves of the air distribution segments (of a given airflow directing unit) at different times according to some pre-programmed sequence to generate different airflow patterns that are directed to one or more of the register units. Moreover, the control system 110 can be programmed to selectively open/close the dampers of the register units at different times according to some pre-programmed sequence to generate different airflow patterns that are pulled towards one or more of the register units by the vacuum force. The sequential activation of different air distribution segments of the airflow directing unit(s) and different dampers of the register units serves to alter the airflow patterns within the room in a way that effectively "sweeps" the airborne particles towards the register units to optimize the collection of airborne particles.

For example, in the embodiment of FIG. 1, the different air distribution segments S1, S2, S2 of the airflow directing unit 140 within the zones Z1, Z2 and Z3 can be activated in a repeated sequence, one at a time, in conjunction with activation of the damper units of the register units 150-1, 150-2, and 150-3 within the zones Z1, Z2 and Z3, one at a time, so that airflow and collection of airborne particles sequentially occurs in each zone Z1. Z1, Z2, one at a time. This sequential activation of the air distribution segments S1, S2, S2 and register units 150-1, 150-2, and 150-3 within the zones Z1, Z2 and Z3 enhances the particle collection functionality of the system 100.

In particular, activating the air distribution segment S1 and the register unit 150-1 in zone Z1 (while turning off the air distribution segments S2 and S3 and closing the dampers of the register units 150-2 and 150-3) is effective to collect particles in zone Z1 while pushing uncollected particles into the next zone Z2. If zones Z1 and Z2 were on at the same time, the airflow in zones Z1 and Z2 may result in the trapping of particles in the corner of the room 180 between the walls 182 and 183. By activating zone Z2 after zone Z1 (and keeping zones Z1 and Z3 deactivated), the particles in zone Z2 can be effectively collected using second register 150-2 with airflow emitted from the second segment S2 of the airflow directing unit 140. By selectively activating the zones in the sequence Z1, Z2, Z3, Z2, Z1, Z2, Z3, Z1 . . . , particle collection system 100 effectively "sweeps" the airborne particles towards the register units 150 and prevents the trapping of particles in the corners of the room, for example.

It is to be understood that the time period at which the different air distribution segments S1, S2, S3 and corresponding register units 150-1, 150-2, 150-3 in the different zones Z1, Z2 and Z3, are sequentially activated can vary depending on the application. For example, in one embodiment, each segment/zone can be activated for a period of, e.g., a few seconds to one or more minutes at a given time. Moreover, it is to be understood that the illustrative activation sequences discussed herein are not to be construed as any limitation of the claimed subject matter. Indeed, the sequence and timing for activating different air distribution segments of the airflow directing unit(s) and for activating different dampers of the register units within a given room will widely vary depending on various factors such as, for example, the room size, the contents of the room, the layout of the airflow directing units and the register units within the room, etc. In all instances, it is desirable to optimize the sequence and timing for activating the different air distribution segments of the airflow directing unit(s) and for activating different dampers of the register units within a given room so as to generate alterable airflow patterns that effectively sweep the airborne particles towards the register units and prevent the trapping of particles in certain areas (e.g., corners) of the room.

Embodiments of the invention include a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the invention are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

These concepts are illustrated with reference to FIG. 7, which shows a computing node 10 comprising a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 7:
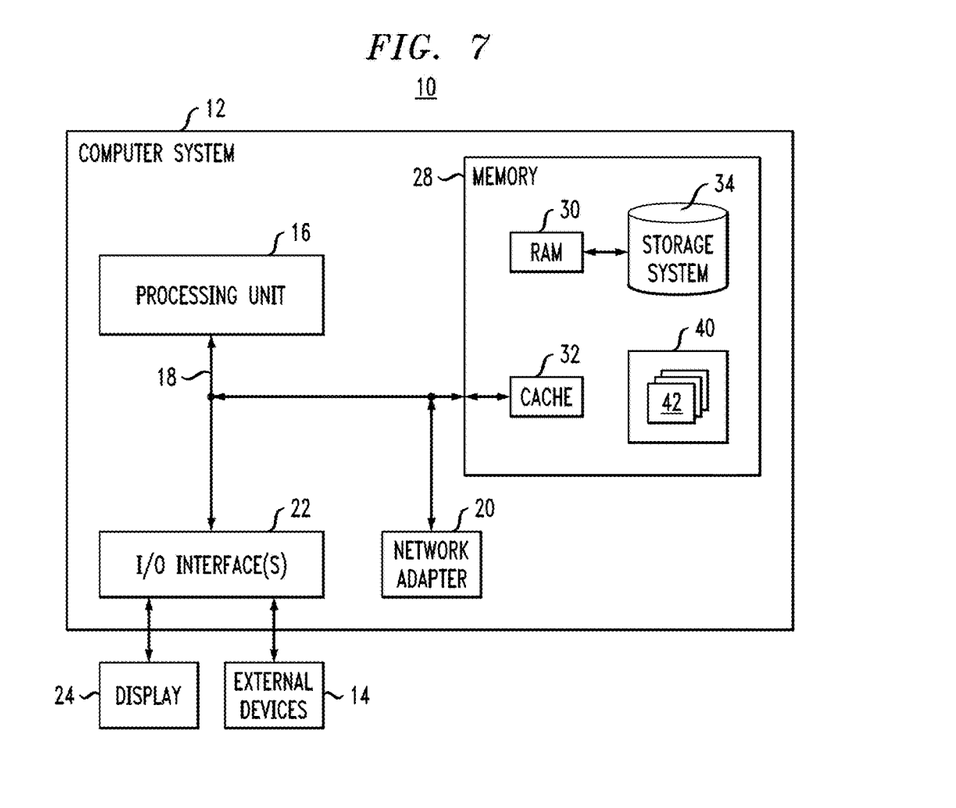

In FIG. 7, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 typically includes a variety of computer system readable media. Such media may be any available media that is accessible by computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/nonvolatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As depicted and described herein, memory 28 may include at least one program product having a set (e.g., at least one) of program modules that are configured to carry out the functions of embodiments of the invention.

The program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although exemplary embodiments have been described herein with reference to the accompanying figures, it is to be understood that the invention is not limited to those precise embodiments, and that various other changes and modifications may be made therein by one skilled in the art without departing from the scope of the appended claims.

What is claimed is:

1. A method for collecting airborne particles, comprising:
    injecting air into an airflow directing unit comprising a primary air tube, and a plurality of separately controlled air distribution segments connected to the primary air tube, wherein each air distribution segment comprises an airflow control valve connected to the primary air tube, an air distribution channel connected to an output of the airflow control valve, and a series of air exits holes aligned to the air distribution channel;
    generating a vacuum force that causes exhaust air with airborne particles to be pulled into one or more register units, wherein each register unit comprises a motorized damper and a filter;
    filtering the exhaust air using the filters of the one or more register units; and
    sequentially activating the airflow control valves of the air distribution segments and the motorized dampers of the register units in a programmed activation sequence to generate alterable airflow patterns between the airflow directing unit and the register units in a plurality of different zones within a room;
    wherein the plurality of different zones within the room comprise n sequentially adjacent zones; and
    wherein the sequential activation of the airflow control valves of the air distribution segments and the motorized dampers of the register units creates air flow within the plurality of different zones in a repeated sequence which comprises a first sequence from a first zone to an $n^{th}$ zone followed by a second sequence from the $n^{th}$ zone to the first zone.

2. The method of claim 1, wherein injecting air and generating a vacuum comprises automatically activating a fan unit, which is connected to the airflow directing unit and to the one or more register units through piping, to forcibly inject air into the airflow directing unit, and to generate the vacuum force in the piping connected to the one or more register units.

3. The method of claim 1, wherein filtering comprises electrostatically filtering the exhaust air that is pulled through the one or more register units.

4. The method of claim 1, wherein sequentially activating the airflow control valves of the air distribution segments comprises sequentially activating one of the airflow control valves of the airflow directing unit so that air is emitted from one of the air distribution segments at a given time, and wherein sequentially activating the motorized dampers of the one or more register units comprises sequentially activating the motorized dampers of the one or more register units so that only one damper of a given register unit is open at a given time.

5. The method of claim 4, wherein each airflow control valve and motorized damper is activated for a period of about two seconds to about one minute.

6. The method of claim 1, further comprising:
    injecting ionized air into the airflow directing unit, wherein the ionized air comprises electrically charged air molecules; and
    applying an electrical charge to the filters of the one or more register units, which is opposite to the electrical charge of the air molecules.

7. The method of claim 6, further comprising programming a control system to automatically adjust an amount of ionization of the ionized air.

8. The method of claim 6, further comprising programming a control system to automatically adjust an amount of electrical charge applied to the filters.

9. The method of claim 1, wherein the airflow directing unit is disposed adjacent to a first wall in the room and wherein the register units are disposed adjacent to a second wall in the room, opposite the first wall.

10. The method of claim 1, wherein the airflow directing unit comprises a shape of a decorative floor or ceiling molding.

11. The method of claim 10, wherein the decorative floor or ceiling molding is formed of a composite material and wherein the primary air tube, the airflow control valves, and the air distribution channels are encapsulated within the composite material.

12. The method of claim 11, wherein the air exit holes of the airflow directing unit comprise perforations that are formed in a front surface of the composite material.

13. An article of manufacture comprising a computer readable storage medium having program code embodied therewith, wherein the program code is executable by a computer to cause the computer to perform method steps for controlling an airborne particle collection system, the method steps comprising:
    causing air to be injected into an airflow directing unit comprising a primary air tube, and a plurality of separately controlled air distribution segments connected to the primary air tube, wherein each air distribution segment comprises an airflow control valve connected to the primary air tube, an air distribution channel connected to an output of the airflow control valve, and a series of air exits holes aligned to the air distribution channel;

causing a vacuum force to be generated, which causes exhaust air with airborne particles to be pulled into one or more register units, wherein each register unit comprises a motorized damper and a filter, and filtered using the filters of the register units; and sequentially activating the airflow control valves of the air distribution segments and the motorized dampers of the register units in a programmed activation sequence to generate alterable airflow patterns between the airflow directing unit and the register units in a plurality of different zones within a room;

wherein the plurality of different zones within the room comprise n sequentially adjacent zones; and wherein the sequential activation of the airflow control valves of the air distribution segments and the motorized dampers of the register units creates air flow within the plurality of different zones in a repeated sequence which comprises a first sequence from a first zone to an $n^{th}$ zone followed by a second sequence from the $n^{th}$ zone to the first zone.

14. The article of manufacture of claim 13, wherein injecting air and generating a vacuum comprises automatically activating a fan unit, which is connected to the airflow directing unit and to the one or more register units through piping, to forcibly inject air into the airflow directing unit, and to generate the vacuum force in piping connected to the one or more register units.

15. The article of manufacture of claim 13, wherein filtering comprises electrostatically filtering the exhaust air that is pulled through the one or more register units.

16. The article of manufacture of claim 13, wherein sequentially activating the airflow control valves of the air distribution segments comprises sequentially activating one of the airflow control valves of the airflow directing unit so that air is emitted from one of the air distribution segments at a given time, and wherein sequentially activating the motorized dampers of the one or more register units comprises sequentially activating the motorized dampers of the one or more register units so that only one damper of a given register unit is open at a given time.

17. The article of manufacture of claim 16, wherein each airflow control valve and motorized damper is activated for a period of about two seconds to about one minute.

18. The article of manufacture of claim 13, wherein the method steps further comprise:

causing ionized air to be injected into the airflow directing unit, wherein the ionized air comprises electrically charge air molecules; and causing an electrical charge to be applied to the filters of the one or more register units, which is opposite to the electrical charge of the air molecules.

19. The article of manufacture of claim 18, wherein the method steps further comprise programming a control system to automatically adjust an amount of ionization of the ionized air.

20. The article of manufacture of claim 18, wherein the method steps further comprise programming a control system to automatically adjust an amount of electrical charge applied to the filters.

* * * * *